Sept. 9, 1952          J. M. CAGE          2,610,288

DIELECTRIC HEATING APPARATUS

Filed April 8, 1947          2 SHEETS—SHEET 1

INVENTOR
JOHN M. CAGE
BY
ATTORNEY

Patented Sept. 9, 1952

2,610,288

UNITED STATES PATENT OFFICE 2,610,288

DIELECTRIC HEATING APPARATUS

John M. Cage, Wellesley, Mass., assignor to Raytheon Manufacturing Company, Newton, Mass., a corporation of Delaware Application April 8, 1947, Serial No. 740,219

11 Claims. (Cl. 219—47)

This invention relates to improvements in apparatus for welding or "sewing" thermoplastic and other dielectric materials with the use of pressure together with heat generated by the application of high frequency oscillating energy.

Previous to this invention, apparatus has been devised for "sewing" or welding thermoplastic sheets together by passing such sheets between opposing spring-pressed electrodes constituting a pair of capacitor plates connected to be energized from a source of radio frequency power to thereby heat the sheets and simultaneously apply pressure through the electrodes to weld the heat-softened sheets together. Generally stated, it is an inherent feature of such apparatus that, with a given amount of applied power, the smaller the spacing between the electrodes, the greater will be the heat produced in the thermoplastic sheets. The application of pressure together with the heat generated in the sheets being "sewed" causes the sheets to soften and to be reduced in thickness or squeezed together and permits the spring-pressed electrodes to move closer together thus, in effect, increasing the heat applied to the sheets. This action tends to be cumulative to cause burning through the sheets unless means is provided to limit the movement of the electrodes towards each other or unless the building up of heat in the material is otherwise limited. Similarly, when a lap joint or seam of greater thickness is encountered as the material to be "sewed" is passed between the electrodes, the heating effect in the sheets is reduced as the electrodes are thus caused to move further away from each other. In order to assure proper welding of the sheet materials, it has been necessary under such conditions to allow a longer time for the heat to be generated in the lap joint of greater thickness or, in other words, the sewing speed of the prior art machines had to be reduced when the joint of extra thickness was encountered.

It is, therefore, an object of this invention to provide an improved form of high frequency dielectric heating and welding machine of the type described for use in "sewing" dielectric materials and having novel means tending to maintain constant distance between the electrodes regardless of temporary variations in thickness of the material being "sewed" as a lap seam or the like is encountered.

It is also an object of this invention to provide an improved form of dielectric "sewing" machine for thermoplastic materials having novel means for controlling the amount of applied high frequency power in accordance with the spacing between the electrodes such that the tendency to burn through the material as the electrodes move closer together is prevented by an automatic reduction of applied high frequency power causing the generated heat in the sheet materials to be lessened and preventing further softening of the sheet materials and also providing for an automatically increased application of power to generate increased heat in the sheet materials when extra thick joints and seams are to be "sewed" or welded.

It is still another object of this invention to provide an improved form of dielectric heating thermoplastic "sewing" machine having an automatic control system for applying high voltage, high frequency energy to the electrodes while they are spaced apart and to reduce the applied voltage as the electrodes move together, the control system thus automatically compensating for fluctuations in thermoplastic sheet material thickness, numbers of layers of the sheet material, non-uniform sheet materials, changes in line voltages, and changes in the "sewing" or welding speed of passing the sheet materials between the electrodes.

It is yet another object of this invention to provide an improved form of dielectric heating and "sewing" or welding machine for dielectric materials having an automatic control system for regulating the amount of applied high frequency power in accordance with the spacing of the electrodes such that no power is applied when the electrodes are spaced closer together than a predetermined minimum spacing.

Further objects and advantages of the invention will be apparent with reference to the following specification and drawings in which.

Figure 1:
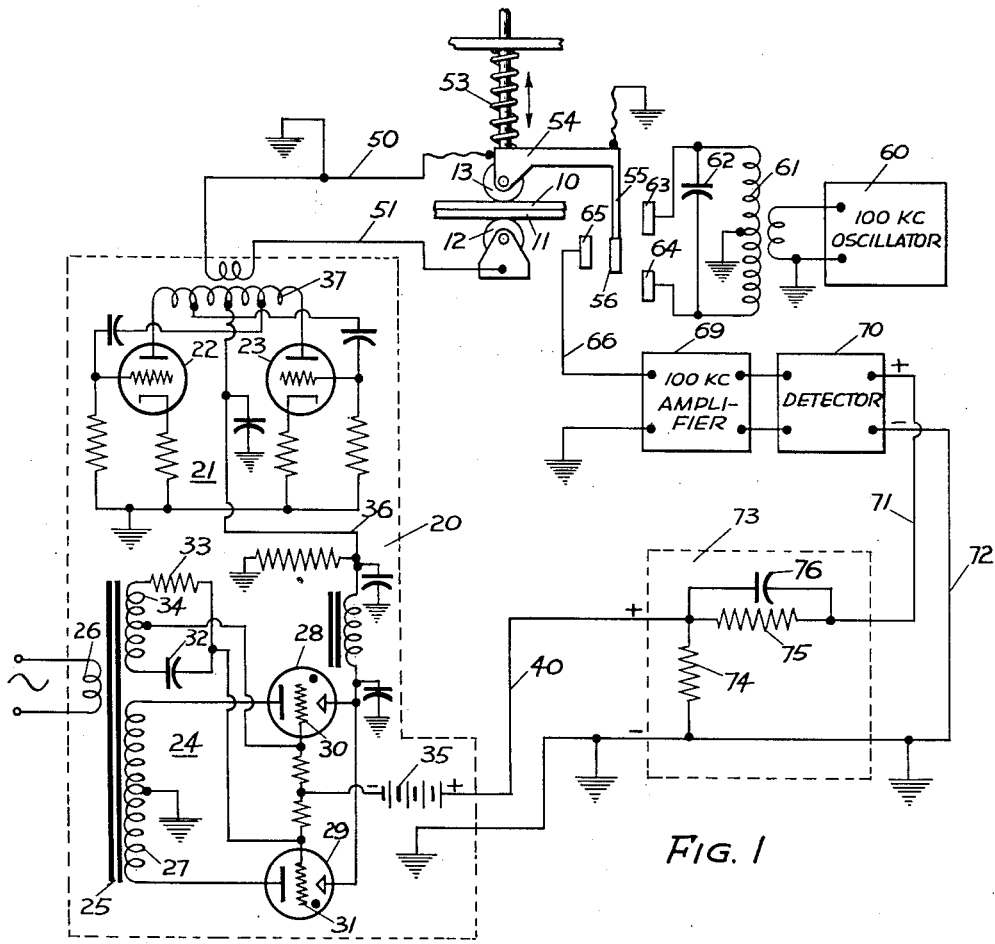
Fig. 1 is a combined schematic and diagrammatic illustration of the automatically controlled dielectric heating system of the invention as applied to "sewing" of dielectric thermoplastic materials.
Figure 2:
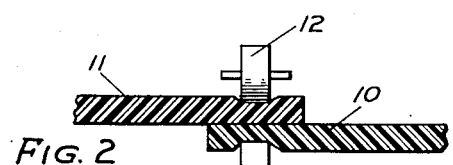
Fig. 2 is a cross sectional elevation showing the position of the "sewing" electrodes and thermoplastic sheets to be joined prior to the softening of the sheets by the application of heat.
Figure 3:
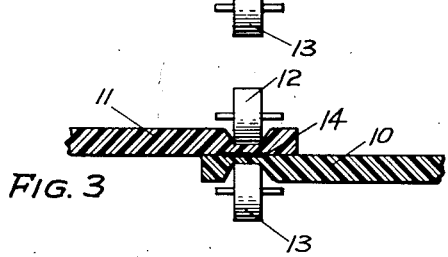
Fig. 3 is very similar to Fig. 2 but showing the position of the sewing electrodes after the thermoplastic sheets have softened and a weld is made.

Referring to Fig. 2 of the drawings, dielectric thermoplastic sheets 10 and 11 may be positioned as shown with their edges overlapping to be joined or "sewed" together to form a seam. A pair of metal electrodes 12 and 13 are provided to supply heat and welding pressure to the sheet materials to thus effect a joint. Each of the metal electrodes 12 and 13 may assume various shapes and forms and a preferred form would be that of a metal roller. One or both of the electrodes 12 and 13 may be spring mounted (see Fig. 1 of the drawings) to urge the electrodes together and compress the thermoplastic sheets 10 and 11 therebetween. Upon the connection of high frequency oscillating energy to the electrodes 12 and 13 in a manner known in the art, heat will be generated in the dielectric thermoplastic materials 10 and 11 which will cause the materials to be softened and permit the electrodes 12 and 13 to move together to the position shown in Fig. 3 of the drawings. By the application of such heat and pressure a weld 14 is produced to join or "sew" the thermoplastic sheets 10 and 11 together.

It is an inherent feature of such apparatus that the heat generated in the dielectric thermoplastic sheet materials 10 and 11 is proportional to the spacing between the electrodes 12 and 13 for a given applied power of oscillating energy, and the closer the spacing between the electrodes 12 and 13, the greater will be the heat generated in the sheet materials 10 and 11. Thus it will be seen that with such apparatus, unless means is provided for discontinuing the application of high frequency oscillating energy after the electrodes 12 and 13 have moved to the position shown in Fig. 3 of the drawings due to softening of the thermoplastic materials 10 and 11, an even greater amount of heat will be generated which is cumulative to cause burning through the materials 10 and 11 and short circuiting of the electrodes 12 and 13. The system of this invention provides automatic control means for reducing the power output of high frequency oscillating energy connected to the electrodes 12 and 13 to be applied to the sheet materials 10 and 11 as the electrodes move towards each other.

Referring to Fig. 1 of the drawings, one form of automatic system of the invention for controlling the power output of applied high frequency oscillating energy to the electrodes 12 and 13 in accordance with the amount of spacing between the electrodes 12 and 13 will be described. A combined high frequency generator or oscillator and associated direct current power supply is shown enclosed in the dotted lines 20. The high frequency oscillator 21 may be of any suitable type and preferably is of the push-pull type illustrated, having a pair of triodes 22 and 23 connected in a push-pull oscillating circuit. It will be understood that the triode tubes 22 and 23 are energized by a suitable filament supply (not shown). High voltage direct current for supplying plate energizing voltages to the oscillator tubes 22 and 23 is obtained from a variable controlled rectifying system 24. The controlled rectifying system 24 includes a power transformer 25 having a primary winding 26 to be connected to an alternating current line source and a high voltage secondary winding 27 connected in a full wave rectifying manner to the controlled thyratron rectifier tubes 28 and 29. The thyratron rectifier tubes 28 and 29 may be of the type having permanently energized cathodes as shown, but indirectly or directly heated cathode types of thyratron tubes may be used if desired. The control grids 30 and 31 of thyratron rectifier tubes 28 and 29 are connected in a conventional manner to a source of shifted phase alternating current obtained from the phase shifting network comprising the condenser 32, resistor 33, and transformer secondary winding 34. In addition to the alternating current of shifted phase as obtained from the phase shifting network and applied to the thyratron control grids 30 and 31, a D. C. potential of negative polarity as obtained from a bias battery 35 is also applied to the control grids 30 and 31. The control circuit for the thyratron rectifier tubes 28 and 29, as described, is arranged to prevent the thyratron tubes 28 and 29 from conducting unless there is a positive control potential in line 40 to overcome the negative bias of the battery 35 as applied to the control grids 30 and 31 and the length of each conductive period during the application of a positive pulsation to the thyratron tubes 28 and 29 is directly proportional to the magnitude of the positive potential in line 40. The positive voltage output of the controlled direct current power supply 24 appearing at the cathodes of controlled rectifier tubes 28 and 29 is suitably filtered and is connected by line 36 to the center tap of the oscillator plate coil 37 while the negative terminals of the oscillator 21 and the power supply 24 are grounded.

With the combined D. C. power supply and high frequency oscillator 20 as described, the power output of the oscillator circuit 21 is automatically controlled and varied in accordance with the D. C. power in line 36 as determined by the conductivity of the thyratron rectifier tubes 28 and 29, which in turn is controlled by the magnitude of the D. C. control potential of positive polarity in the line 40.

The high frequency oscillating energy output from the oscillator 21 is connected by lines 50 and 51 to the roller type sewing electrodes 12 and 13. In the form of the invention being described, the roller electrode 13 is supported upon a movable yoke 54 which is normally urged towards the other electrode 12 by the compression spring 53. Dielectric thermoplastic sheets 10 and 11 to be joined or "sewed" together by the application of pressure together with heat generated by high frequency oscillating energy applied to the roller electrodes 12 and 13 may be continuously passed in any suitable manner (not shown) between the electrodes 12 and 13. The yoke support member 54 also carries an arm 55 and metal vane 56, and the entire structure including the vane 56, arm 55, yoke 54, roller electrode 13, and line 50 may be connected to the grounded side of the output winding of the high frequency oscillator or generator 21.

For the purpose of obtaining a control signal, a 100 kilocycle oscillator 60 of any suitable type is shown in block outline, and its output is inductively coupled to a capacitor bridge network including the center tapped secondary winding 61, fixed condenser 62, and metal electrode plates 63, 64 and 65 connected as shown. The capacitor bridge output signal appears between electrode 65 and the grounded center tap of the bridge input coil winding 61. The metal electrode 65 is positioned with respect to metal electrodes 63 and 64 such that, in the absence of the metal vane 56, it would normally receive equal amounts of energy from both electrodes 63 and 64. Since the energy at any given instant in electrode 63 is 180° opposite in phase to the energy in electrode 64, the total energy capacitively coupled to electrode 65 from electrodes 63 and 64 will be effectively zero due to cancellation. However, this invention provides for the interposition of the grounded metal vane 56 to be movable in the field between the capacitor plates 63, 64 and 65. Since the grounded metal vane 56 is connected to the movable yoke 54 supporting the roller electrode 13, it will be seen that the exact position of the metal vane 56 in the field between the capacitor plates or electrodes 63, 64 and 65 is determined by the relative position or spacing between the electrodes 12 and 13. Thus for a given relative position of the electrodes 12 and 13 the grounded metal vane 56 might be positioned in the field between the electrodes 63, 64 and 65 such that more energy from the electrode 64 will reach the electrode 65 than will energy from the electrode 63. Therefore, under such conditions, there will not be complete cancellation of the total energy at electrode 65 and a 100 kilocycle signal of oscillating energy will appear in the line 66. The exact mechanical arrangement may be chosen, for reasons to be referred to hereinafter, such that the metal vane 56 is positioned in the field between the electrodes 63, 64 and 65 at a point which will cause complete cancellation of energy in the electrode 65 and hence zero signal voltage in line 66 when the roller electrodes 12 and 13 are spaced apart by a minimum predetermined distance after a weld or joint between the thermoplastic materials 56 and 57 is completed.

The signal in line 66, when present, is amplified and detected by a suitable 100 kilocycle amplifier 69 and detector 70 of any well-known type and therefore shown in block outline. The detector 70 is connected in a conventional manner to provide a D. C. voltage of positive polarity in line 71 with respect to the grounded line 72 and having a magnitude that is proportional to the amplitude of the signal in line 66. The detector voltage output thus appearing across lines 71 and 72 is connected through an anti-hunting network 73 to be in series with the grid bias battery 35 of the thyratron rectifier tubes 28 and 29. The connections are such that the detector voltage output of positive polarity in line 71 is applied in opposition to the negative bias of the battery 35 so that the controlled thyratron rectifying tubes 28 and 29 are conductive while there is a detector output control voltage in lines 71 and 72 proportional in amplitude to the amplitude of the signal in line 66. The anti-hunting network 73 may be comprised of a differentiating circuit including resistors 74, 75 and condenser 76 connected as shown. The differentiating network provides an output voltage whose amplitude is proportional to the rate of change in the applied voltage in lines 71 and 72, and the constants of the differentiator circuit may be suitably chosen to compensate for the responsiveness to an integral of change by the amplifier 69 and the controllable rectifier 24 with respect to the changes in position of the roller electrodes 12 and 13 such that small and rapid fluctuations in signal voltage will be ineffective as will be described in further detail hereinafter.

The controlled rectifier 24, connected as previously described, is of the type in which the lengths of conductive periods for the thyratron rectifier tubes 28 and 29 are varied in accordance with the magnitude of the D. C. component of positive polarity applied to the control grids 30 and 31. Thus, in such a system having a negative bias battery 35 for normally preventing the thyratron tubes 28 and 29 from being conductive during the entire period of an application of a positive pulsation thereto, the length of the conductive periods for the thyratron rectifier tubes will be proportional to the magnitude of D. C. control voltage of positive polarity in line 40 for overcoming the negative bias battery 35. Furthermore, since the power supply 24 is providing the plate voltage for the oscillator 21, it will be seen that the power output of the oscillator 21 is proportional to the magnitude of the positive potential in line 40 which indirectly is in turn proportional to the position of the metal vane 56 and the relative spacing between the roller electrodes 12 and 13.

Considering now the operation of the invention as described in connection with Fig. 1 of the drawings, the position of the metal vane 56 is initially adjusted such that there is zero signal in line 66 from the 100 kilocycle oscillator 60 and associated capacity bridge circuit when the roller electrodes 12 and 13 are spaced apart by a minimum predetermined distance. As previously stated, the minimum predetermined distance may be selected to be that shown in Fig. 3 of the drawings, corresponding to the position of the "sewing" electrodes 12 and 13 after the thermoplastic materials 10 and 11 have softened and welded together. Therefore, upon completion of the weld, when using the system of this invention, there is zero signal in line 66, thus providing zero detector output voltage in lines 71 and 40 and causing the negative grid bias battery 35 to prevent the conduction of thyratron rectifier tubes 28 and 29 during the entire application of positive pulsations thereto. Thus, the oscillator 21 is not provided with plate voltage, and therefore, zero power output of oscillating energy is obtained for connection to the roller electrodes 12 and 13 when they are spaced apart by the minimum predetermined distance after a weld is completed. In actually operating the apparatus of this invention, however, the high dielectric thermoplastic materials 10 and 11 are continuously passed between the roller electrodes 12 and 13 with a predetermined "sewing" speed, thus continuously presenting unheated and unsoftened sheet material to be welded, and tending to urge the electrodes 12 and 13 apart to a distance greater than the minimum predetermined distance. Under such conditions, a control signal appears in line 66 due to the movement of the metal vane 56 from its previous position as shown, corresponding to the minimum predetermined spacing between the electrodes. Thus, a direct current detector voltage output, having a positive polarity in lines 71 and 40, is obtained as the roller electrodes 12 and 13 move apart, to thereby overcome the negative bias potential of battery 35 and permit thyratron rectifier tubes 28 and 29 to conduct for energizing the high frequency oscillator 21 and applying welding energy to the roller electrodes 12 and 13. It should now be apparent that the system, arranged as shown, provides for an entirely automatic control of the power output of the oscillator 21 in accordance with the spacing between the roller electrodes 12 and 13 such that the greater the spacing between the electrodes 12 and 13, the greater will be the applied power. Therefore, with the apparatus of this invention, it is not necessary to slow down the "sewing" speed for passing the sheet materials 10 and 11 between the roller electrodes 12 and 13 when a multi-ply joint of extra thickness is reached. Such extra thickness forces the roller electrodes 12 and 13 to move an even greater distance apart, thus increasing further the power output of the high frequency generator 21 to produce additional welding heat in the greater thickness of dielectric material to be welded.

The functioning of the anti-hunting network 73 should now be clearly understood to be that of preventing oscillations in the control system due to the response delays of the amplifier 69, detector 70 and the control rectifying circuit 24 to the relative movement of the electrodes 12 and 13. By precisely designing the amplifier 69, detector 70 and the controlled rectifier system 24 in consideration of the probable movement of the electrodes 12 and 13 and the corresponding reactions of the variable capacitor bridge network including the movable metal vane 56 and electrodes 63, 64 and 65, it might be possible to eliminate the anti-hunting network, although for all practical purposes the anti-hunting expedient is believed necessary. It should be obvious that a selection of a particular frequency of operation for the 100 kilocycle control signal oscillator 60 and the associated amplifier 69 and detector 70 is a matter of choice, not determinant of the operation of the system.

Under certain conditions, the automatic system described above in connection with Fig. 1 of the drawings might be ineffective to prevent burning through the sheet materials 10 and 11 by the roller electrodes 12 and 13. For example, should the sheet materials 10 and 11 have an area of non-uniform thickness such that the electrodes 12 and 13 are moved in response to the compression spring 53 to a position closer together than the aforesaid minimum predetermined distance, the metal vane 56 would be moved to a position past the null or balancing point of the capacity bridge and a signal would again appear across line 66 and ground causing the detector to produce a direct current of positive polarity in lines 71 and 40 for permitting the thyratron rectifier tubes 28 and 29 to again become conductive. Thus, the high frequency oscillator 21 would be energized to provide power oscillations to the electrodes 12 and 13 which would generate heat in the non-uniform thin area of sheet materials 10 and 11 referred to, thus softening the material and further permitting the electrodes 12 and 13 to move even closer together. Since this action is cumulative, it is apparent that with the system described in Fig. 1, under the conditions of operation referred to in this paragraph, the power output of the high frequency generator 21 would continue to increase until the dielectric sheet materials 10 and 11 are completely burned through and the roller electrodes 12 and 13 are short circuited. In order to prevent the occurrence of such burning through of the sheet materials 10 and 11 under such conditions of expected operation, the system may be modified as shown in Fig. 4 of the drawings.

Figure 4:
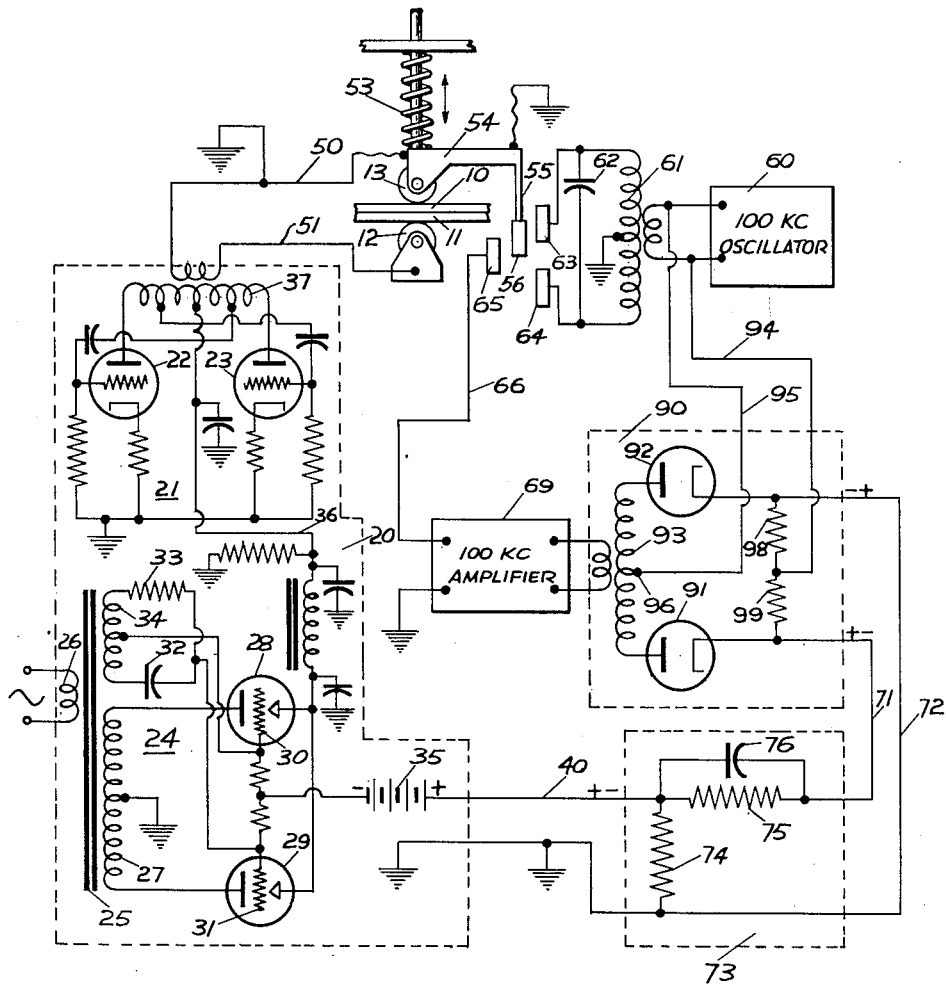
Fig. 4 is an illustration similar to Fig. 1 but showing a modified automatic system of the invention.

Referring to Fig. 4 of the drawings, those elements of the automatic control system which are identical with the elements described in connection with Fig. 1 will be given the same reference numerals and will not be further described. The automatic control system of Fig. 4 is essentially the same as that of Fig. 1 but includes a special form of detector 90 for detecting the control signal in line 66 as amplified by the amplifier 69. The detector 90 includes a differential amplitude detection circuit having a pair of diode tubes 91 and 92 whose respective plates are connected to the respective ends of a center-tapped winding 93 for inductive coupling to the output of amplifier 69. The output of the 100 kilocycle signal oscillator 60 is also connected by lines 94 and 95 to the differential amplitude detection circuit, and line 95 is connected to the center tap 96 of the secondary winding 93 while line 94 is connected to the mid-point of a voltage divider comprised of resistors 98 and 99 connected between the cathodes of the detector diode tubes 91 and 92. The differential amplitude detector 90, connected as shown, provides in a known manner a direct current output voltage across lines 71 and 72 whose polarity is determined in accordance with the leading or lagging phase relations between the signal at the output of amplifier 69 and the signal at the output of the 100 kilocycle oscillator 60.

Considering the operation of the modified form of the invention as described in Fig. 4 of the drawings, it will be seen that, for all positions of the metal vane 56 corresponding to variations in spacing between the roller electrodes 12 and 13 greater than the minimum predetermined spacing, the signal in line 66 will be either leading or lagging the phase of the output signal from the 100 kilocycle oscillator 60, depending upon the initial connections of the metal electrodes 63 and 64 to the bridge winding 61. Should the roller electrodes 12 and 13 for any reason move closer together than the minimum predetermined distance, the position of the metal vane 56 will then be such that the opposite condition of signal across line 66 and ground will obtain. In other words, assuming that, for all spacings between the electrodes 12 and 13 greater than the predetermined minimum electrode spacing, the signal in line 66 will be leading the phase of the output signal of the oscillator 60, then, when the electrodes 12 and 13 are moved closer together than the minimum predetermined spacing, the signal in line 66 will be opposite in phase by 180° to the previous signal and lagging in phase to the output signal of the oscillator 60. The differential amplitude detector 90 is therefore connected in a manner to allow for a known amount of phase shift in the amplifier 69 and provides a direct voltage output appearing across lines 71 and 72 having a positive polarity in line 71 so long as the spacing between electrodes 12 and 13 is greater than the minimum predetermined spacing. Should the spacing between the electrodes 12 and 13, for any reason whatever, become less than the minimum predetermined spacing, the polarity of the direct current signal appearing across lines 71 and 72 will be reversed, such that the potential polarity in line 71 will be negative. Thus, under such conditions, the polarity of the control signal in line 40 will also be negative, to be added to the negative bias already obtained from the battery 35 and further preventing the conductivity of thyratron rectifier tubes 28 and 29, such that the high frequency generator 21 is deenergized and provides no power output when the spacing between the electrodes 12 and 13 is less than the predetermined amount. Therefore, the special form of signal detector used in the system of Fig. 4 provides an additional safeguard against the burning through of the sheet materials 10 and 11, should the electrodes 12 and 13 be in some manner moved closer together than the predetermined minimum desired spacing.

It should be understood that the various component parts of the system may be changed by the substitution of equivalent designs without departing from the spirit and scope of the invention as defined by the appended claims. For example, the power output of the high frequency oscillator 21 may be controlled in any desired manner, other than by the controlled rectifier power supply, in response to a control signal obtained from the relative movement of the "sewing" or welding electrodes, as described by this invention in its broadest sense.

What is claimed is:

1. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, and a circuit responsive to the spacing between said electrodes for controlling the variable power output of said source comprising means for varying the power input to said source as a direct function of electrode spacing.

2. The apparatus for heating dielectric materials comprising, a pair of metal electrodes, means normally urging said electrodes together, the dielectric materials to be heated being passed between said electrodes, a source of high frequency oscillating energy connected across said electrodes, a controllable variable power output rectifying system for energizing said source, and a circuit responsive to the spacing between said electrodes for controlling the variable power output of said system as a direct function of electrode spacing.

3. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, and means responsive to the spacing between said electrodes for controlling the variable power output of said source in such manner that the power output is reduced as the electrodes move closer together, said last-named means being further responsive to a predetermined minimum spacing between said electrodes to deenergize said source.

4. The apparatus for heating dielectric materials comprising, a pair of metal electrodes, means normally urging said electrodes together, the dielectric materials to be heated being passed between said electrodes, a source of high frequency oscillating energy connected across said electrodes, a controllable variable power output rectifying system for energizing said source, and means responsive to the spacing between said electrodes for controlling the variable power output of said system in such manner that the power output of said source is reduced as the electrodes move closer together, said last-named means being further responsive to a minimum predetermined spacing between said electrodes to throttle said system and deenergize said source.

5. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, means comprising a variable capacitance for providing a control signal having an amplitude varying in direct proportion of variations in spacing between said electrodes, and means responsive to the amplitude of said control signal for controlling the variable power output of said source as a direct function of electrode spacing.

6. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, means providing a control signal having an amplitude varying in direct proportion to variations in spacing between said electrodes, and means responsive to the amplitude of said control signal for controlling the variable power output of said source in such manner that the power output is reduced as the electrodes move closer together, said last-named means being further responsive to the amplitude of said control signal to thereby deenergize said source upon the electrodes being moved together to less than a predetermined minimum spacing.

7. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, means providing a control signal having an amplitude varying in direct proportion to variations in spacing between said electrodes, and a control system responsive to the amplitude of said control signal for controlling the variable power output of said source in such manner that for all variations in spacing between the electrodes above a predetermined minimum spacing the power output is reduced as the electrodes move closer together.

8. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, means providing a control signal having an amplitude varying in direct proportion to variations in spacing between said electrodes, said signal having one polarity for all variations in electrode spacing above a minimum predetermined spacing and having the opposite polarity for all variations in electrode spacing less than the predetermined minimum spacing, means responsive to the amplitude of said control signal of said one polarity for controlling the variable power output of said source in such manner that the power output is reduced as the electrodes move closer together, and means responsive to the opposite polarity of said control signal for deenergizing said source.

9. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, means for providing an alternating current control signal, a capacity bridge circuit having its input terminals connected to said alternating current signal, means to rectify the output signal from said bridge circuit, means responsive to the amplitude of the rectifier output signal for varying in direct proportion the power output of said source, and means responsive to the spacing between said electrodes for unbalancing said bridge circuit, whereby the amplitude of said rectifier output signal is directly proportional to the spacing between said electrodes.

10. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, means for providing an alternating current control signal, a capacity bridge circuit having its input terminals connected to said alternating current signal, the output terminals of said bridge circuit being connected to an amplifier and a detector for rectifying an output signal from said bridge, means responsive to the amplitude of the rectifier output signal for varying in direct proportion the power output of said source, and means responsive to the spacing between said electrodes for unbalancing said bridge circuit, whereby the amplitude of said rectifier output signal is directly proportional to the spacing between said electrodes.

11. The apparatus for heating dielectric materials comprising, a pair of metal electrodes, means normally urging said electrodes together, the dielectric materials to be heated being passed between said electrodes, a controllable variable power output source of high frequency oscillating energy connected across said electrodes, means for providing an alternating current control signal, a capacity bridge circuit having its input terminals connected to said alternating current signal, means to rectify the output signal from said bridge circuit, means responsive to the amplitude of the rectifier output signal for varying in direct proportion the power output of said source, means responsive to the spacing between said electrodes for unbalancing said bridge circuit, whereby the amplitude of said rectifier output signal is directly proportional to the spacing between said electrodes, said rectifier including means for reversing the polarity of the rectifier output signal when the electrode spacing is less than a predetermined minimum, said source being deenergized by the reversal of polarity of said rectifier output signal.

JOHN M. CAGE.

REFERENCES CITED

The following references are of record in the file of this patent:

UNITED STATES PATENTS

| Number | Name | Date |
| --- | --- | --- |
| 2,236,998 | Gillette | Apr. 1, 1941 |
| 2,251,277 | Hart et al. | Aug. 5, 1941 |
| 2,316,875 | Laboulais | Apr. 20, 1943 |
| 2,324,068 | Crandell | July 13, 1943 |
| 2,453,680 | Sweeny | Nov. 9, 1948 |
| 2,458,059 | Christensen et al. | Jan. 4, 1949 |
| 2,473,143 | Graham et al. | June 14, 1949 |
| 2,504,754 | Sweeny | Apr. 18, 1950 |
| 2,516,324 | Joy | July 25, 1950 |
| 2,522,823 | Hayes et al. | Sept. 19, 1950 |

OTHER REFERENCES

"Radio Sealing," Wireless World, January 1945, page 29.